June 14, 1932.  E. J. VON HENKE  1,862,642
TRANSFORMER
Filed Feb. 11, 1929   5 Sheets-Sheet 1

INVENTOR
Edmund J. Von Henke
BY
Gifford, Scull & Burgess
ATTORNEYS

June 14, 1932. E. J. VON HENKE 1,862,642
TRANSFORMER
Filed Feb. 11, 1929 5 Sheets-Sheet 2

INVENTOR
Edmund J. Von Henke
BY
Gifford, Scull & Burgess
ATTORNEYS.

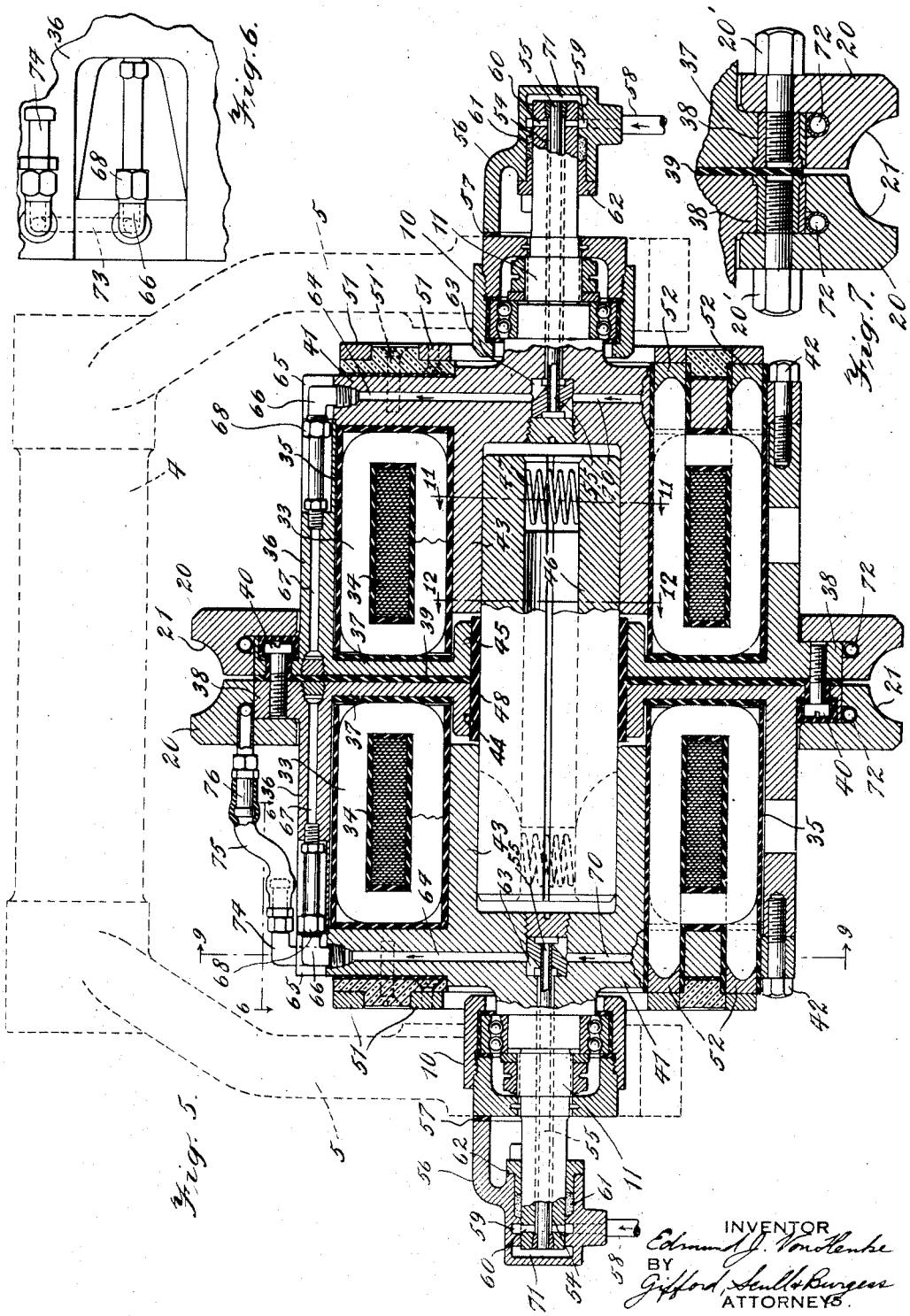

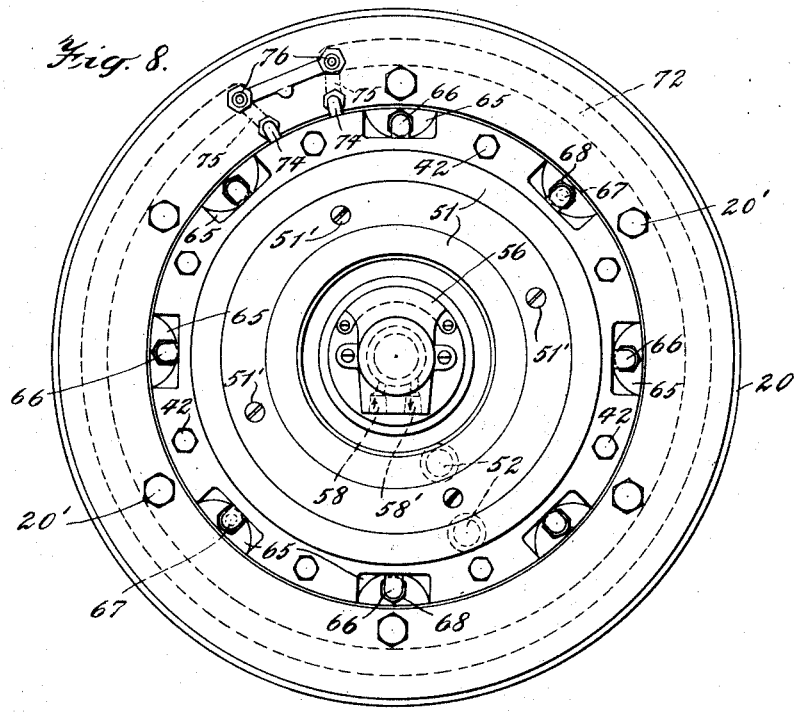
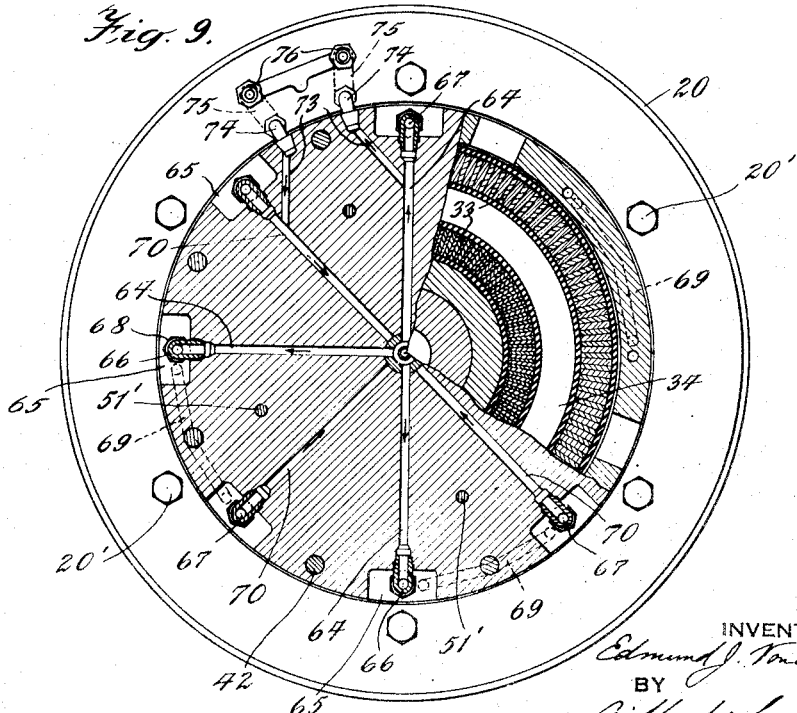

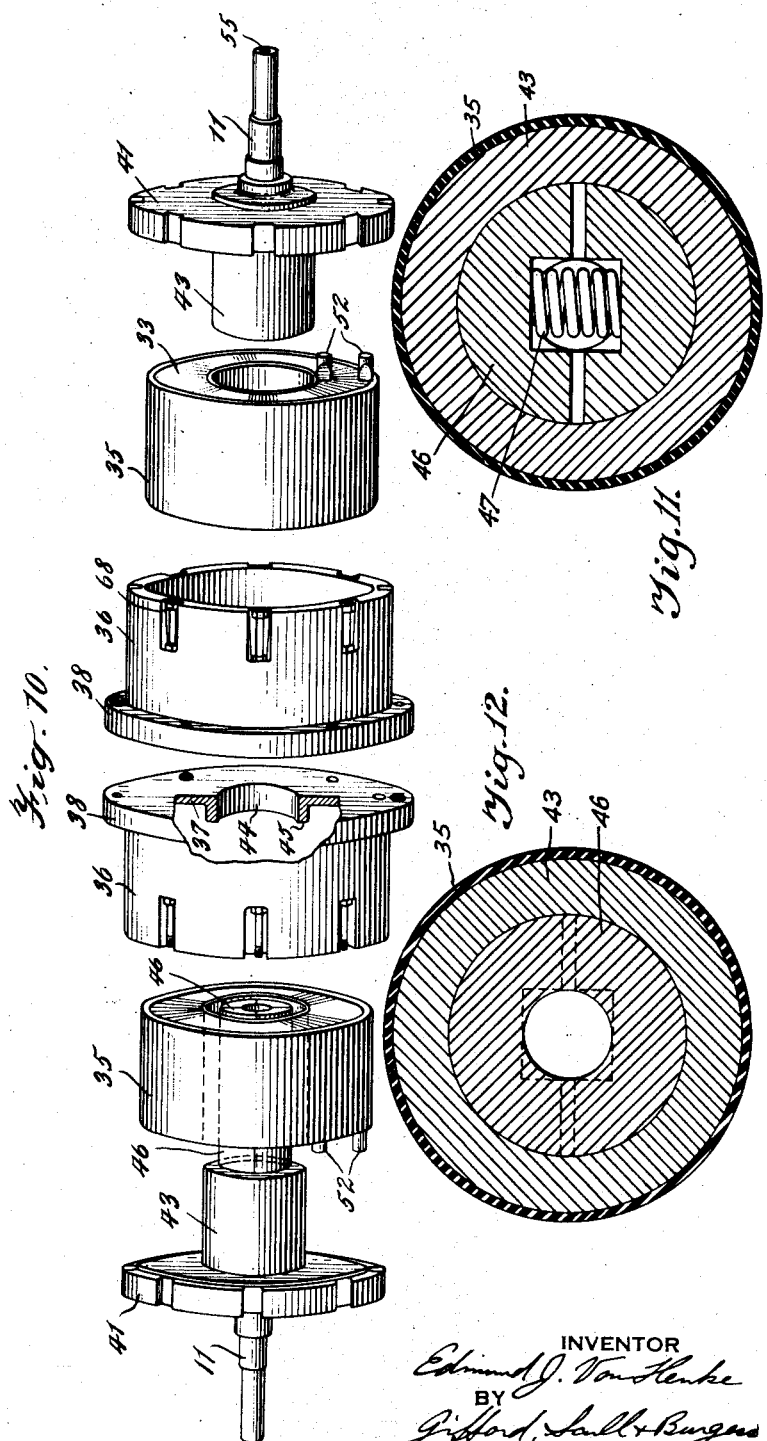

Patented June 14, 1932

1,862,642

UNITED STATES PATENT OFFICE

EDMUND J. VON HENKE, OF CHICAGO, ILLINOIS, ASSIGNOR TO AMERICAN ELECTRIC FUSION CORPORATION, OF CHICAGO, ILLINOIS, A CORPORATION OF ILLINOIS

TRANSFORMER

Application filed February 11, 1929. Serial No. 339,123.

This invention relates to a novel and improved transformer, more particularly of the rotary type, and the novel features will be best understood from the following description and the annexed drawings, in which is shown a selected embodiment of the invention and in which;—

Fig. 5 is a horizontal section through the transformer.

Fig. 6 is a fragmentary view showing a detail of certain connections which will be more fully explained, this view being taken on the line 6—6 of Fig. 5 but omitting the flexible connection appearing in Fig. 5.

Fig. 7 is a detailed view illustrating the method of securing the welding rings to the transformer proper.

Fig. 8 is an end view of the transformer, particularly showing the connections for cooling fluid.

Fig. 9 is a vertical section through the transformer, taken approximately on the line 9—9 of Fig. 5, parts being broken away.

Fig. 10 is an exploded view of the transformer illustrating the relation of the various parts to each other.

Fig. 11 is a section on the line 11—11 of Fig. 5.

Fig. 12 is a section on the line 12—12 of Fig. 5.

Figure 1:
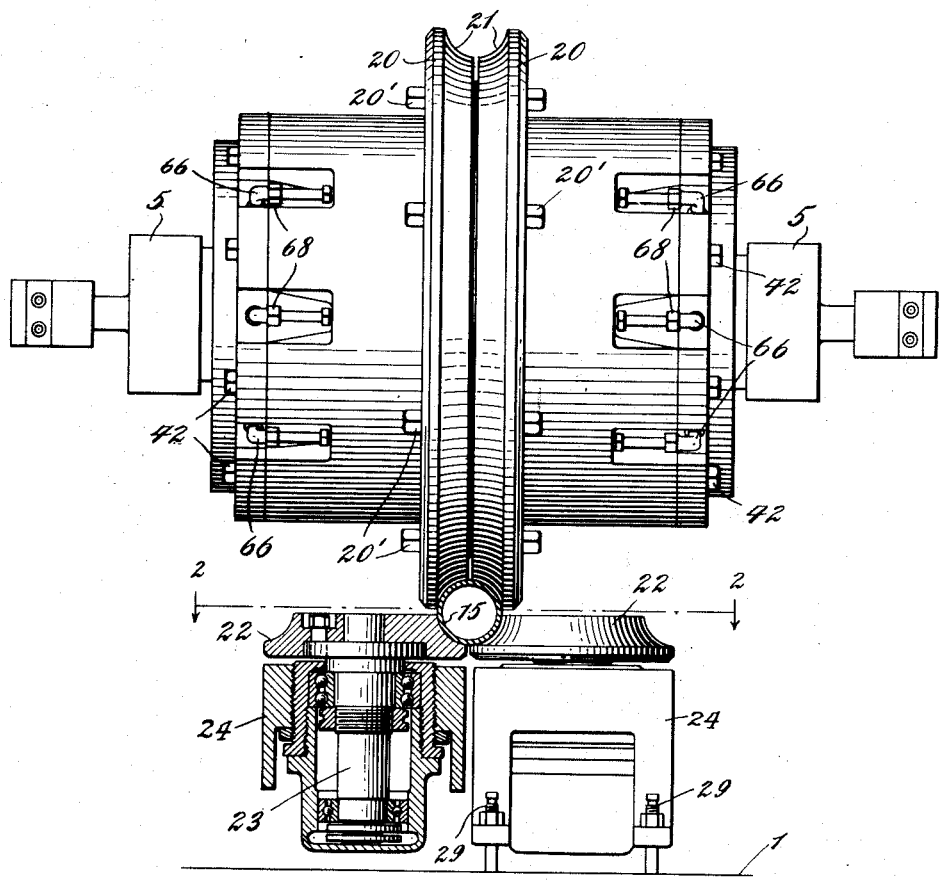
Fig. 1 is a front view of the transformer and associated rolls.

The invention is particularly useful in connection with welding tubing and will be described as if used for that purpose, although it is to be understood that other uses come within the scope of the invention.

The transformer is mounted upon a suitable base 1 from which extends upwardly a standard 2 having a bearing in which is mounted a shaft 3 carrying a sleeve 4 upon which are a plurality of arms 5. At their outer ends these arms are provided with bearings, each of which is formed of a stationary part 6 and a movable part 7 pivoted to the stationary part as at 8. This movable part may be secured to the stationary part as by a bolt 9, the two parts holding between them a bearing box 10 within which is received a ball-bearing for a rotatable shaft 11. As plainly shown in Figs. 5 and 10, there is one of these shafts at each end of the transformer, and by this arrangement the transformer is rotatably mounted in the arms.

Depending from the sleeve is one or more arms 12 having their lower ends engaged by adjusting screws 13 threaded into the standard and engaging the enlarged lower ends 14 of the arms 12. By this arrangement the weight of the transformer causes the end 14 to rest against a screw 13 and adjustment of this screw will vary the position of the transformer with respect to the work, here shown as a tube 15.

In order to support the transformer above and out of contact with the work, when occasion requires, I provide a collapsible support comprising a shoe 16 (Fig. 3) mounted upon a pivot arm 17 and held in engagement with the transformer by means of a brace 18 pivoted to the arm 17 adjacent the shoe and having its lower end adapted to be received in a socket 19 in the base. By this means the transformer may be lifted out of engagement with the work and held in position out of the way until the work is in place.

In the form shown the transformer is adapted to weld the seam in a piece of tubing 15, and for that purpose is provided with a pair of welding rings or electrodes 20 which are spaced apart and which are formed with curved surfaces 21 to engage the tubing. Disposed beneath the rings 20 and adapted to cooperate therewith is a pair of rolls 22, each of which is mounted upon a vertical shaft 23, as best shown in Fig. 1. These rolls have faces which are adapted to engage the tubing as the rolls rotate. Each shaft is supported in a bracket 24 pivoted at 25 and normally urged apart by the spring 26. Adjustable stops 27 contact with the brackets at 28 and prevent outward movement thereof by the action of the spring 26. By this arrangement the rolls may be properly adjusted horizontally with respect to the work.

Figure 2:
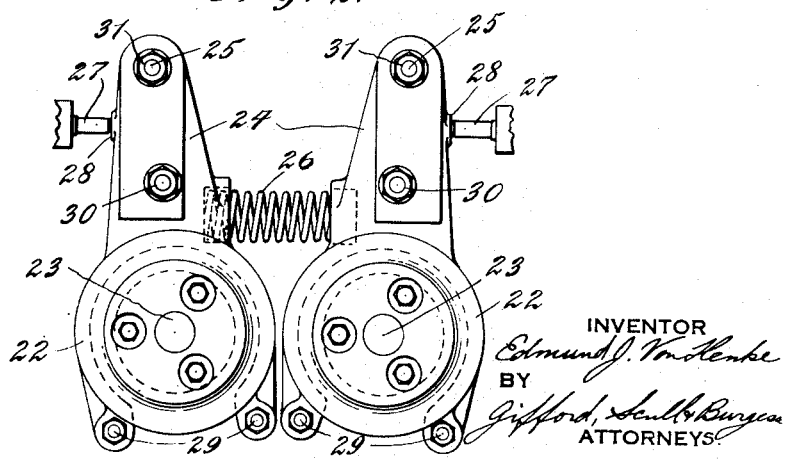
Fig. 2 is a view on the line 2—2 of Fig. 1, but with the work omitted.
Figure 3:
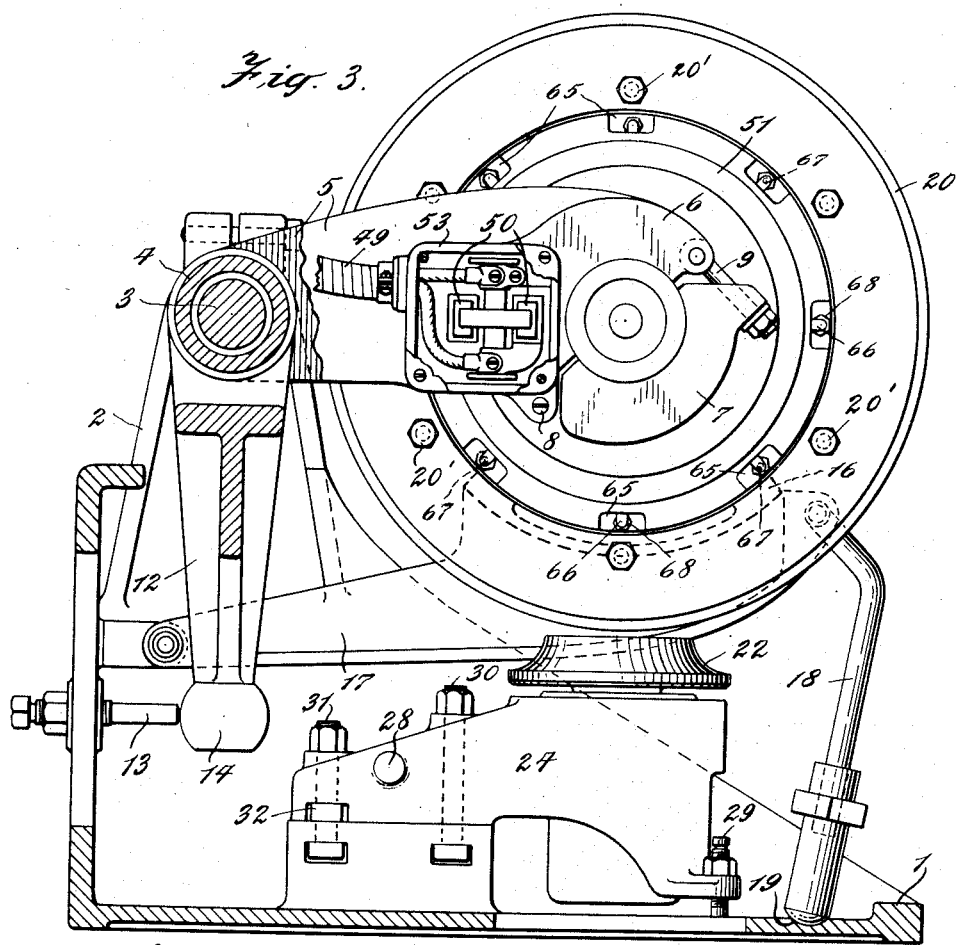
Fig. 3 is a side elevation of the transformer, parts being broken away and shown in section.

Vertical adjustment of the rolls may be obtained by the means shown in Fig. 3, and which comprises the adjusting screw 29, the bolt 30, and the pivot bolt 31. This pivot bolt is also provided with a bearing nut 32 which may be adjusted vertically on the bolt to lift or lower that end of the bracket, the other end of the bracket being adjusted by the screws 29. These screws 29 are preferably threaded on ears formed on the brackets, as plainly shown in Figs. 2 and 3.

Referring now particular to Figs. 5, 7 and 10, it will be seen that the transformer comprises two primaries, each primary consisting of a winding 33 disposed about the core 34 and all surrounded with an insulating jacket 35. Each transformer, therefore, has a primary in the form of a ring, and this ring is received within a cylindrical shell which has the wall 36 and a base 37. Each base has a continuation in the form of a flange 38 and, as plainly shown, these two flanges and the bases are placed back to back with a sheet of insulating material 39 therebetween, and the rings 20 are then bolted to the flanges as shown in Fig. 7 by bolts 20'. The bolts securing the two flanges together are indicated in Fig. 5 at 40, and each bolt is insulated from one of the flanges as plainly shown in that figure.

Nesting with the shell and primary ring is a cover plate 41 having holes therein by means of which bolts 42 may secure it to the wall 36 of the shell. Each cover plate has an axially disposed annular flange 43 adapted to engage the inner part of the insulating jacket 35 of the primary. It will be seen that each of the bases 37 is provided with an axially disposed opening 44 surrounded by an annular flange 45, and this flange is in alignment with the flange 43, but spaced therefrom.

Disposed within the flanges 43 and 45 is a core 46 formed of a plurality of parts forced apart into tight engagement with the flanges 43 as by means of springs or wedges. In the illustrated embodiment a spring 47 is shown as exemplifying a means for this purpose.

Figure 4:
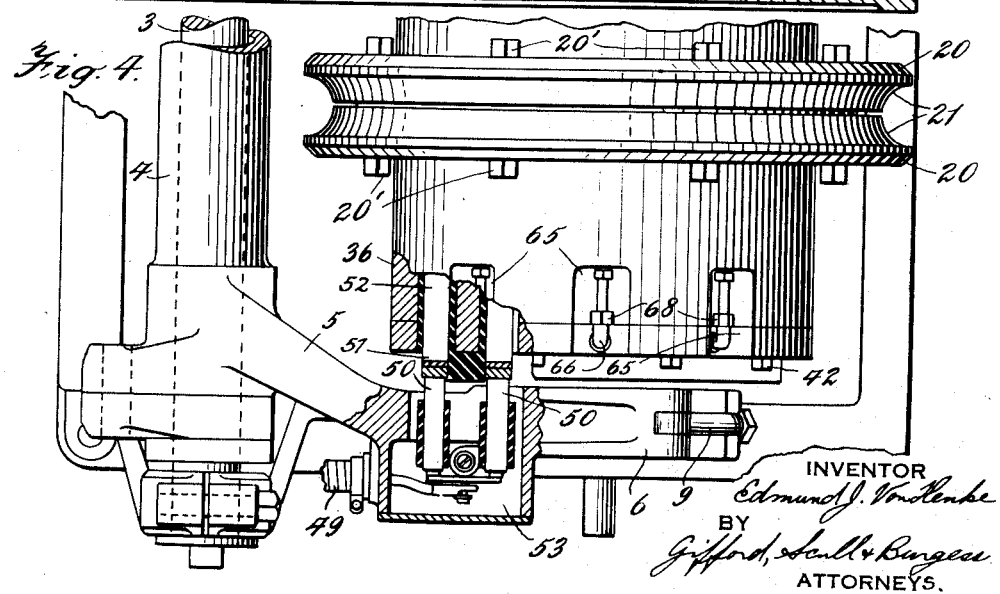
Fig. 4 is a partial plan of the structure appearing in Fig. 3, portions also being broken away in this figure.

It will be seen that the core 46 being in close engagement with the flanges 43, forms an electrical connection therebetween, but it is insulated from the flanges 45 by a ring 48. Therefore, the apparatus thus far described comprises a transformer having two primaries and a single secondary. Current is provided from any suitable source of power and is delivered to the primary through cables 49, one on each end of the transformer, and which are shown in Figs. 3 and 4. These cables deliver the current to contacts 50 which bear against contact rings 51 supported on a plate insulated from the cover plate and secured thereto by screws 51'. These rings engage with leads 52, as best shown in Figs. 5, 8 and 10. By this arrangement the current is supplied to the primaries, and a secondary current is induced in the secondary which is common to both primaries. It will be noted that the flanges 45 and 43 are spaced and insulated from each other as are also the two rings 20, so that these rings form the two electrodes from which current may pass through the work disposed in contact therewith.

The contacts 50 may be conveniently mounted in boxes 53, one on each of the arms 5, as shown in Figs. 3 and 4. In order to cool the transformer I provide a cooling system and one which is all metal where expansion and contraction takes place, so as to avoid temperature stresses. This system is best shown in Figs. 5, 8 and 9, and referring thereto it will be seen that each of the shafts 11 is provided with a central bore 54 in which is mounted a tube 55 spaced from the walls of the bore, whereby two concentric ducts are provided lengthwise of the shafts.

Mounted on the end of each shaft is a head 56 which is insulated from the bearing at 57. This head is adapted to remain relatively stationary with respect to the rotating shaft 11 during operation of the welding apparatus of which the transformer constitutes a part. Water or other fluid is supplied to the head through a duct 58 and in this form the water is shown as entering an annular passage 59 in the head which communicates with the bore 54 through radial passages 60. Leakage along the surface of the shaft is resisted by a suitable packing 61 held in place by a gland or other device 62, as shown.

The water passes along the bore 54 into a chamber 63 in the cover plate 41, this chamber being divided by a diagonally extending partition into two parts. One of these parts has a plurality of radially extending bores 64 communicating therewith. These bores terminate in recesses 65 and are connected by suitable connections 66 with longitudinally extending bores 67 in the walls 36 of the shells. This arrangement provides a means whereby a continuous duct is formed through the cover plate and wall of each shell but, at the same time, permits the parts to be disconnected, when necessary, a suitable coupling 68 in the connection 66 being provided for this purpose.

The end of each bore 67 is connected by a passage 69 with a corresponding longitudinally extending bore 67 which in turn is connected to another radially extending bore 70 in the cover plate. These bores 70 communicate with a part of the chamber 63 on the opposite side of the diagonal partition. This part of the chamber communicates directly with the tube 55 at its inner end, as plainly shown in Fig. 5, whereby the water or other cooling fluid may pass out of the tube into the chamber 71 in the head. A suitable duct 58', (Fig. 8), may connect with this chamber to lead the water back to the source of supply. The chambers 59 and 71 therefore form inlet and outlet chambers, it being understood that while I have shown and described the flow in one direction, the flow may equally well be reversed if that is desired.

In order to also cool the electrodes or rings 20, I provide annular conduits 72 in these rings and connect these conduits to the circulating system described above. This may be done in the manner best shown in Figs. 5, 6, 8 and 9, by providing bores 73 connecting with bores 64 and 70, and each in turn being connected to fittings 74 which carry a flexible connection 75 joined to a fitting 76 upon one of the rings. While the drawings shown and I have described one such connection between the circulating system and the ring conduits, it is to be understood that a similar construction is provided on the other half of the transformer.

In operation, tubing or other work to be welded is fed between the rings 20 and the rolls 22, the transformer being adjusted about its pivot 3 to give the desired amount of pressure exerted upon the work, and the rolls 22 may be adjusted to bring them into proper relation to the work. While the work is being inserted in place, the transformer may be supported out of contact with the work by means of the collapsible support comprising the members 17 and 18.

As the work is fed through the space between the rings and rolls, the rings and the entire transformer will rotate and the necessary current for welding will be supplied to the rings, in a manner plain to those skilled in the art. Injurious heating of a transformer will be avoided by means of the circulation of water or other cooling fluid through the circulating system described above.

The construction described above results in a transformer in which the electrodes or welding rings are connected across their interior by a substantially continuous metal wall, thereby furnishing a continuous and a substantially rigid support for the rings. The arrangement of the transformer primary in the form of a ring which is inserted within the shell of part of the transformer, and the arrangement of the cover plate with respect to the primary ring, provides a device in which the parts may be easily assembled and disassembled with a minimum of trouble and labor. The cover plate and primary may be removed from either side of the transformer without dismantling the entire transformer and without affecting the other side thereof.

The cooling system is one in which I have avoided all rubber packing, thus reducing to a minimum the possibility of leakage in the system due to expansion and contraction from heating. This system, particularly in combination with the means for cooling the welding rings, adequately and efficiently protects the transformer from overheating.

I claim :—

1. In combination, base, a standard extending upwardly from said base and having a pivot thereon, an arm rotatably mounted on said pivot, a transformer rotatably carried by said arm, and welding electrodes on said transformer and connected to the secondary thereof.

2. In combination, a base, a standard extending upwardly from said base and having a pivot thereon, an arm rotatably mounted on said pivot, a transformer rotatably carried by said arm, welding electrodes on said transformer and connected to the secondary thereof, means to support work in operative relation to said electrodes, and means to adjust said arm to vary the position of the electrodes with respect to the work.

3. In combination, a base, a standard extending upwardly from said base and having a pivot thereon, an arm rotatably mounted on said pivot, a transformer rotatably carried by said arm, welding electrodes on said transformer and connected to the secondary thereof, means to support work in operative relation to said electrodes, the weight of the transformer tending to cause the electrodes to exert pressure on the work, and a stop adapted to limit movement of the transformer towards the work.

4. In combination, a base, a standard extending upwardly from said base and having a pivot thereon, an arm rotatably mounted on said pivot, a transformer rotatably carried by said arm, welding electrodes on said transformer and connected to the secondary thereof, means to support work in operative relation to said electrodes, and a removable support adapted to hold the transformer away from the work.

5. In combination, a base, a standard extending upwardly from said base and having a pivot thereon, an arm rotatably mounted on said pivot, a transformer rotatably carried by said arm, welding electrodes on said transformer and connected to the secondary thereof, contact rings on said transformer, and contacts supported on said arm and adapted to engage said rings.

6. In combination, a base having a standard extending upwardly therefrom, a transformer rotatably mounted on a substantially horizontal pivot on said standard and having a pair of welding electrodes in the form of rings, a pair of rolls supported on substantially vertical axes, the arrangement of rings and rolls being such as to receive between them a tube to be welded by said electrodes, and means for adjusting said rings and rolls with respect to each other.

7. In combination, a base having a standard extending upwardly therefrom, a transformer rotatably mounted on a substantially horizontal pivot on said standard and having a pair of welding electrodes in the form of rings, a pair of rolls supported on substantially vertical axes, the arrangement of rings and rolls being such as to receive between them a tube to be welded by said electrodes, and means for adjusting said rolls vertically and horizontally with respect to said electrodes.

8. In combination, a base having a standard extending upwardly therefrom, a transformer rotatably mounted on a substantially horizontal pivot on said standard and having a pair of welding electrodes in the form of rings, a pair of rolls supported on substantially vertical axes, the arrangement of rings and rolls being such as to receive between them a tube to be welded by said electrodes, a spring tending to force said rolls apart, and adjustable stops opposed to said spring and limiting movement of the rolls.

9. In combination, a pair of electrodes in the form of rings spaced apart, means insulating said rings from each other, means for passing electric current through said rings and across the space therebetween, and a continuous support for said rings extending diametrically across the interior thereof and holding them together on a common axis.

10. In combination, a pair of electrodes in the form of rings spaced apart, means insulating said rings from each other, means for passing electric current through said rings and across the space therebetween, a support for said rings substantially completely closing the space diametrically within the rings, and means securing said rings together on a common axis.

11. In combination, a transformer, a pair of electrodes in the form of rings electrically connected to the transformer, means for rotatably supporting said rings, a support for said rings disposed concentrically therewith and extending radially inwardly therefrom, means securing both of said rings to said support, and a core disposed centrally of said rings and fitting within an opening of said support to complete a supporting means extending diametrically across the interior of said rings.

12. In combination, a transformer, a pair of electrodes in the form of rings electrically connected to the transformer, means for rotatably supporting said rings, a support for said rings disposed concentrically therewith and extending radially inwardly therefrom, means securing said rings to said support, a core disposed centrally of said rings and within an opening of said support, said core being formed in sections, and means to force said sections apart to substantially close said opening and to form a substantially continuous support diametrically across the rings.

13. In a transformer, a cylindrical shell having a base with an opening therein surrounded by an axially disposed flange, a primary in the form of a ring disposed within said shell between its outer wall and the flange, a cover plate having an axially disposed flange within said ring and disposed substantially in line with the flange of said shell, means for securing said cover plate to said shell, and electrode rings secured to and surrounding said shell.

14. In a transformer, a cylindrical shell having a base with an opening therein surrounded by an axially disposed flange, a primary in the form of a ring disposed within said shell between its outer wall and the flange, a cover plate having an axially disposed flange within said ring and disposed substantially in line with the flange of said shell but having its end spaced therefrom, means for securing said cover plate to said shell, a second transformer of similar construction having a shell with its base secured to the first-named base but insulated therefrom, an electrical connection between the flanges of said cover plates, and two welding rings disposed on said bases and each secured to one of them.

15. In combination, two cylindrical shells each having a base and an outer wall, said shells being disposed with their bases parallel and adjacent to each other and with their walls parallel to a common axis, insulating means between said bases, a ring-shaped primary winding disposed within each shell adjacent the outer wall thereof, a common secondary for said primaries including said outer walls, outwardly extending flanges on said walls, and welding rings secured to said flanges.

16. In combination, two cylindrical shells each having a base and an outer wall, said shells being disposed with their bases parallel and adjacent to each other and with their walls parallel to a common axis, insulating means between said bases, a ring-shaped primary winding disposed within each shell adjacent the outer wall thereof, a common secondary for said primaries including said outer walls and a core extending through holes in said bases and insulated therefrom, outwardly extending flanges on said walls, and welding rings secured to said flanges.

17. In a transformer, a secondary of large cross-sectional area, a circulating system for cooling fluid comprising bores in said secondary, a shaft rotatably supporting said transformer, and means to supply fluid to said system during rotation of said transformer, said means comprising coaxial passages through said shaft, one acting as an inlet and the other as an outlet.

18. In a transformer, a secondary of large cross-sectional area, a circulating system for cooling fluid comprising bores in said secondary, a shaft rotatably supporting said transformer, and means to supply fluid to said system during rotation of said transformer, said means comprising coaxial passages through said shaft, one acting as an inlet and the other as an outlet, a chamber having a partition therein dividing it into two parts, each connected to one of said passages and to certain of said bores.

19. In a transformer, a cylindrical shell having an outer wall and a base, a ring-shaped primary winding disposed in said shell adjacent said outer wall, a cover plate holding said ring in the shell and having an axially extending flange disposed within the ring, means to secure the cover plate to the shell, said wall having longitudinally extending bores therein and circumferentially extending bores connecting them, said cover plate having radially extending bores therein, and connections between the bores in the wall and those in the cover plate, said bores and connections forming part of a circulating system for cooling fluid.

20. In a transformer, a cylindrical shell having an outer wall and a base, a primary ring disposed in said shell adjacent said outer wall, a cover plate holding said ring in the shell and having an axially extending flange disposed within the ring, means to secure the cover plate to the shell, said wall having longitudinally extending bores therein and circumferentially extending bores connecting them, said cover plate having radially extending bores therein, connections between the bores in the wall and those in the cover plate, said bores and connections forming part of a circulating system for cooling fluid, a welding ring carried by said transformer and having an annular conduit therein, and connections between said conduit and said circulating system.

21. In a rotary transformer, a pair of electrodes in the form of spaced rings, two transformers coaxial with said rings and disposed on opposite sides of a plane passing through said rings perpendicular to the axes thereof, each of said transformers comprising a primary and a secondary, means electrically connecting said secondaries to form a common secondary for both said primaries and means securing said rings to the transformers.

22. In combination, two welding rings spaced apart on opposite sides of a plane perpendicular to the axes thereof, a transformer disposed on each side of said plane and coaxial with said rings, means securing said rings to the transformers, members secured to said rings and extending diametrically inwardly therefrom, and a core against which the inner ends of said members bear.

23. In welding apparatus, the combination of a base, a horizontal rotary shaft mounted on said base, a transformer secondary mounted on said shaft, electrodes on said transformer and connected to the secondary thereof, a roller for supporting the work in coacting relation to said electrodes, means for supporting said transformer, and means for adjusting the position of said transformer and electrodes relative to said roller.

24. In welding apparatus, the combination of a shaft, a transformer secondary mounted directly on said shaft, spaces in said secondary, transformer primaries in said spaces, said secondary being electrically continuous between said spaces and said shaft, but discontinuous between said spaces and it periphery, and circular electrodes attached to said secondary around the periphery and in a plane perpendicular to the longitudinal axis of said shaft.

25. A welding transformer comprising two copper members having a central opening, a shaft in said opening and acting to electrically and mechanically connect said members together, spaces inside said members, primaries in said spaces and a cylindrical portion outside of said primaries and detachable electrodes connected with said outside portions and insulated from each other.

26. A welding transformer having a primary, a secondary in inductive relation to said primary and consisting of two similar members, each of which is cylindrical with a space inside thereof, a shaft passing through said members and electrically and mechanically connecting them together, insulating material between the peripheries of said members, and means for attaching electrodes to said members adjacent said insulation.

27. In combination, a base having a standard extending upwardly therefrom, a pivot on said standard, an arm rotatably mounted on said pivot, a transformer rotatably carried by said arm, welding electrodes on said transformer and connected to the secondary thereof, and means for adjustably supporting said arm.

28. In combination, a base having a standard extending upwardly therefrom, pivots on said standard, bell crank levers rotatably mounted on said pivots and each having one arm extending in a vertical direction adjacent said standard and the other extending in a horizontal direction, a transformer rotatably mounted on said last-named arms and adjustable means engaging said standard and the other arms to support the transformer above the base, welding electrodes on said transformer and connected to the secondary thereof, and means on the base beneath the transformer to support the work in operative relation to said electrodes.

29. An electric welding apparatus comprising means to guide and traverse a metal blank, spaced electrodes having a common axis to engage the blank, and means pivotally supporting said electrodes at a common point at one side of their axis.

30. An electric welding apparatus comprising means to guide and traverse a metal blank, spaced electrodes having a common axis to engage the blank, means pivotally supporting said electrodes at a common point at one side of their axis, and means to adjust said electrodes toward and from the metal blank on a common arc.

31. An electric welding apparatus comprising a rotary transformer provided with spaced electrodes on a common axis, means to guide and traverse a metal blank with respect to said electrodes, and means pivotally supporting said transformer and electrodes at one side of said axis.

32. An electric welding apparatus comprising means to guide and traverse a metal blank, spaced electrodes having a common axis to contact with said blank, a frame pivotally supporting both of said electrodes, and means pivotally supporting said frame at one side of the axis of the electrodes.

EDMUND J. von HENKE.